June 30, 1942. J. S. REARICK 2,288,484
REGENERATION OF CATALYSTS BY COMBUSTION
Filed Oct. 31, 1940
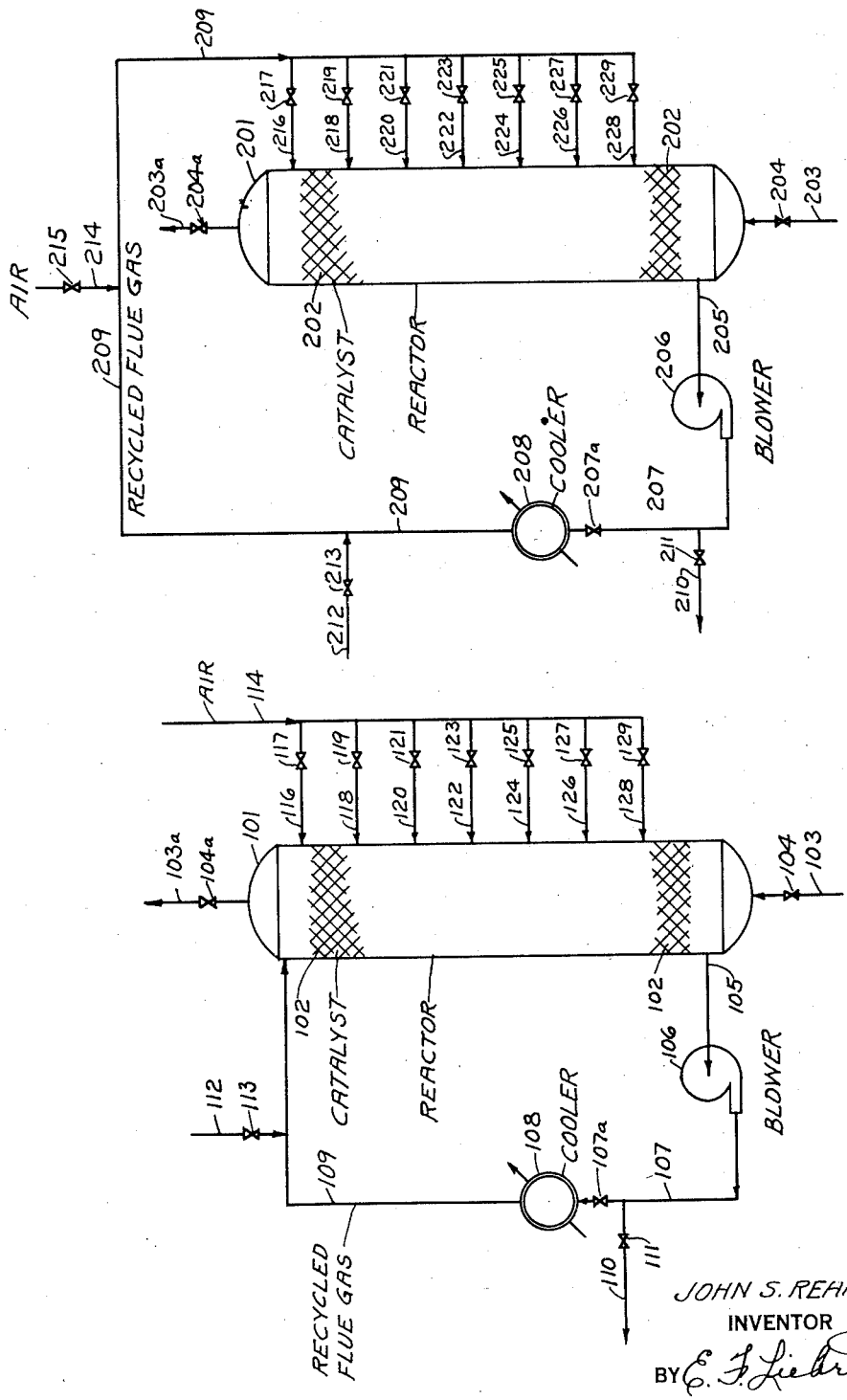
JOHN S. REARICK.
INVENTOR
BY E. F. Liebrecht
ATTORNEY Patented June 30, 1942

2,288,484

UNITED STATES PATENT OFFICE 2,288,484

REGENERATION OF CATALYSTS BY COMBUSTION

John S. Rearick, Westfield, N. J., assignor to The M. W. Kellogg Company, Jersey City, N. J., a corporation of Delaware Application October 31, 1940, Serial No. 363,748

3 Claims. (Cl. 252—242)

This invention relates to the regeneration of solid catalytic material which has been deactivated by the accumulation thereon of a carbonaceous deposit. More particularly, the invention relates to the treatment of deactivated catalytic material to effect combustion of such carbonaceous contaminants, regenerate the catalytic material and restore its catalytic activity.

In the regeneration of solid catalytic material contaminated with a carbonaceous deposit, it has been customary to contact the catalyst with an oxygen-containing gas such as air to effect combustion of the carbonaceous matter and remove it from the catalyst. For example, a stream of oxygen-containing gas is passed through a vessel containing a body of contaminated catalyst to effect the desired combustion. Because of the heat liberated by the combustion of carbonaceous matter, relatively high temperatures may be developed during such a regeneration treatment. Inasmuch as high temperatures may be harmful to the catalyst in causing permanent impairment of its activity, it has been proposed to reduce the intensity of the combustion by reducing the oxygen content of the regenerating gas. This has been done by diluting the air ordinarily used as the source of oxygen with an inert gas, such as flue gas produced by the same or some other regeneration treatment. For example, some of the hot flue gas produced by a regeneration treatment may be cooled and recycled to the combustion zone. Thus, part of the heat liberated by the combustion is absorbed in heating the recycled flue gas, and dilution of the combustion air with this flue gas causes combustion to proceed more slowly.

It has been found that in the regeneration of many types of catalyst by a procedure such as the foregoing, combustion does not take place simultaneously throughout the entire volume of a body of catalyst; rather, combustion begins at the point where ignition first occurs and proceeds through the catalyst mass as a burning band or "flame front," which leaves substantially carbon-free regenerated catalyst in its wake. Combustion may cease, however, unless the air-flue gas mixture is supplied at or above the ignition temperature of the carbonaceous matter. When this is done the flame front will originate at the point of introduction of the said mixture and travel away from that point.

As the mixture proceeds through the flame front its oxygen content is depleted to the point where it will no longer support combustion and it becomes flue gas. Thereafter the hot flue gas passes through the remainder of the catalyst body without effecting combustion of carbonaceous material and serves only to heat the catalytic material over which it passes. As catalyst adjacent the point of introduction of the regenerating gas is substantially completely freed of carbonaceous contaminants the oxygen in the mixture penetrates farther into the catalyst body. This is the reason for the formation of a moving zone of combustion referred to as a flame front, which proceeds through the catalyst body from the point of introduction of the regenerating gas toward the point of withdrawal of the combustion gas. As the regenerating gas mixture passes from its point of introduction through catalyst material which has been regenerated it is preheated to a degree which varies as the flame front moves away from the said point of introduction.

These effects are disadvantageous in that the preheating of the regenerating gas mixture and unregenerated catalyst intensifies the combustion and promotes undesired overheating, and also in that the varying degree of preheating of the regenerating gas results in undesirable variation in the intensity of combustion, making it difficult to maintain a constant temperature. Furthermore, the preheating of the regenerating gas simultaneously cools the regenerated catalytic material to a degree which varies from point to point along the path of the flame front. After regeneration of the catalyst mass is complete, therefore, it is found that the catalyst mass is not at a uniform temperature. This condition is undesirable for the subsequent conversion treatment in which the catalyst mass is to be employed.

An alternative method of operation exists wherein combustion is initiated at a point in the catalyst mass near the exit for the combustion gases and wherein the flame front thus established proceeds through the catalyst mass toward the point of introduction of the regenerating gas. Regenerating gas then traverses unregenerated catalyst on its way to the flame front. It is difficult if not impossible to avoid igniting the contaminants at the point of introduction of the regenerating gas when, as is necessary to continuity of combustion, that gas is introduced at a temperature approaching the ignition temperature of the contaminants.

An object of my invention is the provision of a method of regeneration of solid catalytic material which obviates the difficulties described above. Another object of my invention is the provision of a method of catalyst regeneration wherein heating of unregenerated catalyst by hot combustion gases and heating of regenerating gas by hot regenerated catalyst are at a minimum. A further object of my invention is the provision of a method of regeneration which possesses some of the characteristics of an operation wherein a flame front and a regenerating gas travel through a catalyst mass counter current to each other, but which avoids the difficulties connected with that method.

In general terms I achieve the foregoing objects by successively regenerating portions of a catalyst, there being concurrent travel of a flame front and an air-flue gas mixture in each portion while it is undergoing regeneration. I exclude the air-flue gas mixture from portions not yet regenerated, but pass the combustion products through all regenerated portions.

In the following more detailed description of the invention, from which further objects and advantages of the invention will appear, reference will be made to the annexed drawing, wherein:

Figure 1 is a diagrammatic elevation of apparatus suitable for carrying out a preferred embodiment of the method of my invention, and Figure 2 is a diagrammatic elevation of apparatus suitable for carrying out an alternate embodiment of the invention.

In Figure 1, 101 is a catalyst chamber containing a bed of catalyst 102. A conventional catalyst chamber design is shown in order to simplify subsequent description, and it will be understood that the invention is adaptable to numerous other types of reactors. The catalyst 102 is, upon commencement of the regeneration method of my invention, coated or contaminated with a deposit of carbonaceous matter. Such contaminants are deposited in numerous hydrocarbon conversion processes and it will be assumed that catalyst 102 is a cracking catalyst such as an alumino-silicate, formed into pellets. A deposit will have been laid down on the catalyst by highly heated hydrocarbon vapors, connections for the introduction and withdrawal of which are shown as lines 103 and 103—a, respectively. Inasmuch as hydrocarbon conversion must be discontinued during regeneration of the spent catalyst, valves 104 and 104—a in lines 103 and 103—a, respectively, will remain closed throughout the procedure to be described.

The base of reactor 101 is provided with an outlet 105 for the withdrawal of flue gas and this outlet is connected to a blower or other vapor-impelling device 106 which discharges into line 107. The purpose of the blower is to overcome the pressure drop encountered in recirculating flue gas through the equipment. The flue gas line 107 having a valve 107—a is connected to a cooler 108 which may be of any suitable type adequate to lower the temperature of the flue gas as required by the process. Excess flue gas over and above the quantity desired to be recycled is withdrawn from line 107 through line 110, the amount withdrawn being controllable by means of valve 111. Cooled flue gas to be recycled passes through line 109 to the top of the reactor. An auxiliary line 112 provided with a valve 113 is connected with line 109 for the purpose of introducing flue gas at the beginning of the regeneration and before the internal production of flue gas has commenced. This auxiliary flue gas used at the beginning of the regeneration process may suitably be withdrawn from an adjoining reactor wherein regeneration is already under way.

An air injection manifold 114 leads to a series of air injection lines 116, 118, 120, 122, 124, 126 and 128, which are respectively provided with valves 117, 119, 121, 123, 125, 127, and 129. These injection lines are connected to the reactor 101 at spaced intervals along the extent of the catalyst bed, the uppermost injection line being just above the top of the catalyst bed and the lowermost injection line being somewhat above the bottom of the catalyst bed.

The operation of the apparatus shown in Figure 1 in accordance with my method of regeneration is as follows.

After passage of hydrocarbon vapors has been discontinued and the remaining traces thereof have been purged from the reactor, for example by means of steam or other inert gas introduced and withdrawn through lines 103 and 103—a, respectively, valves 104 and 104—a are closed. Valves 111 and 113 are opened and blower 106 is operated to circulate auxiliary flue gas through the spent catalyst, valve 107—a being closed. When circulation has been established, the flue gas entering at a temperature at or above the ignition point of the carbonaceous matter on the catalyst, valve 129 is opened and air is admitted. A flame front will thereupon originate at the inlet of line 128 and will travel downwardly through the section of catalyst situated below. Once combustion has commenced, valve 113 is closed, valve 107—a is opened and the position of valve 111 is adjusted so that part of the hot products of combustion are withdrawn through line 110 and part diverted through the cooler 108 to the recirculating line 109.

The quantity of flue gas thus recirculated and the amount of air introduced through line 128 are adjusted in accordance with the temperature in the combustion zone, so as to maintain the latter at the highest temperature known not to adversely affect the activity of the catalyst. This point will be determined by the particular type of catalyst employed and may be in the vicinity of 1100° for the cracking catalyst assumed in this description. The technique of temperature control by means of flue gas recirculation is well known to those skilled in the art of catalytic conversion and need not be enlarged upon herein.

It will be observed that during the combustion of contaminants in that section of the catalyst bed lying between line 128 and the bottom, the remainder of the catalyst is not traversed by flue gas at combustion temperature. When regeneration of this bottom section of catalyst has been completed, as may be ascertained by means of temperature-measuring devices located therein, I close valve 129 and open valve 127, whereupon a new flame front will originate at the point where line 126 enters the reactor and will again travel downwardly. This occurrence will still leave those portions of the catalyst lying above line 126 unaffected and upon the commencement of combustion in the section between lines 126 and 128 the catalyst therein will be at a relatively low temperature. Moreover, the hot products of combustion produced in regenerating the second section of catalyst traverse only the lowermost section wherein regeneration has already been completed. In a similar manner I proceed to regenerate successively higher sections of the catalyst by successively opening valves 125, 123, 121, 119 and 117, in each case closing the valve immediately below at the same time. When regeneration of the topmost section of the catalyst is complete the entire catalyst bed will be at a substantially uniform elevated temperature and I proceed immediately to resume hydrocarbon conversion by closing the air and flue gas lines, purging the reactor with steam, and admitting hydrocarbon vapors.

The apparatus of Figure 2 is suitable for carrying out an alternate embodiment of the invention and comprises a reactor 201 filled with catalyst 202. The reactor is provided with hydrocarbon connections and valves 203, 203—a, 204 and 204—a, respectively, exactly the same as in Figure 1. Likewise the apparatus of Figure 2 includes a flue gas exit line 205, a blower 206 and a flue gas outlet line 210 having a valve 211. Recirculated flue gas again is passed to a cooler 208 and continues through a line 209. There is an auxiliary flue gas connection 212 having a valve 213. In this embodiment of the invention, however, the recirculated flue gas is admixed with air externally of the reactor, this being made possible by the provision of a single air injection line 214 having a valve 215 and connected to the flue gas line 209. An air-flue gas mixture of proper proportions may thereby be produced in line 209 which is manifolded with a series of valved injection lines 216, 218, 220, 222, 224, 226 and 228. The latter are connected to the reactor at intervals as in Figure 1.

The apparatus of Figure 2 is placed in operation similarly to Figure 1. After admitting auxiliary flue gas from an adjacent reactor through line 12, passing it through line 209, introducing it into the reactor through line 228 and rejecting it through lines 205, 207 and 210, I open the valve 215 in the air line 214. As the air-flue gas mixture thus produced enters the reactor at or above the ignition temperature of the contaminating deposit on the catalyst, a flame front originates at the inlet of line 228 and travels downwardly. As before, I close valve 213 and open valve 207—a immediately after combustion commences and establish temperature control by adjusting valves 211 and 215. Subsequent steps in operating the apparatus of Figure 2 are analogous to those described in connection with Figure 1. When combustion has been completed in the lowermost section of the catalyst bed, valve 229 is closed, valve 227 is opened and the remainder of the catalyst is successively regenerated in like manner. At the conclusion of the regeneration, the catalyst bed will be at a substantially uniform temperature.

As previously mentioned, the procedure described with reference to Figure 1 is the preferred embodiment of my invention, in spite of the fact that sections of unregenerated catalyst are traversed by hot flue gas in accordance therewith, while in the procedure of Figure 2, no flue gas whatsoever traverses sections not yet regenerated. In Figure 1, the recirculated flue gas does not acquire the property of supporting combustion until it reaches the section being regenerated, so that ignition at a higher point is impossible even though the flue gas is at or above the ignition temperature. Moreover, although this flue gas is hot, it is considerably cooler than the combustion temperature due to the cooling effected in cooler 108. The apparatus of Figure 1 will be cheaper to construct than that of Figure 2 because the manifolded injection lines carry only the air and are cooled thereby. They can therefore be made smaller and expensive high-temperature-resistant alloys are unnecessary.

Upon completion of regeneration by either of the hereinbefore described methods, the catalyst bed will be in the neighborhood of the combustion temperature. This temperature will in most cases be well above the temperature desired to be maintained during the ensuing reaction step, and if desired one feature of my invention may advantageously be employed in restoring the catalyst bed to the desired reaction temperature. This involves, with respect to the apparatus of Figure 1, the admission of relatively cool flue gas or other cool inert gas through the air manifold 114 to line 116, its passage through the reactor, and its withdrawal through line 105 or line 103. As soon as the section lying between lines 116 and 118 is cooled sufficiently, valve 117 is closed and valve 119 is opened, diverting the cooling medium to the next section below, i. e., the order of admission is the reverse of that described with reference to regeneration. At the conclusion of this procedure the catalyst bed will be substantially uniformly at the lower temperature.

It is to be understood that the specific structure and details of procedure shown and described are illustrative only, and that numerous modifications thereof may be devised without departing from the spirit of the invention. For example, the number of sections into which the catalyst is divided is susceptible of wide variation, and is not limited to seven as shown. Also, the recycle flue gas and air may travel through a reactor in any direction desired, the same as or the reverse of the direction in which reactant vapors travel during conversion. Operation of the injection line control valves may advantageously be made automatic so that as temperature begins to fall in any section, as a result of combustion having been completed therein, a temperature-responsive element will close off the injection line supplying that section and open the line leading to the next section to be regenerated.

I claim:

1. In a method of removing carbonaceous contaminants from a relatively elongated body of solid catalytic material by combustion of said contaminants in an oxygen-containing gas, the improvement which comprises introducing an oxygen-containing gas into said body of catalyst at a point near one of its ends and passing said gas through that section of said body lying between said point and said end to regenerate catalyst in said section by combustion of contaminants thereon, discontinuing the passage of said gas through said section, introducing oxygen-containing gas into said body at a second point more distant from said end than said first point and passing said gas through that section of said body lying between said second point and said end to regenerate catalyst lying between said first and second points, and continuing in like manner to regenerate successively the remaining catalyst in said body.

2. A method of removing carbonaceous contaminants from a solid catalytic material by combustion of said contaminants in a stream of oxygen-containing gas which comprises passing a stream of inert gas through the whole of said catalytic material while initially supplying a separate stream of oxygen-containing gas only to a first portion of said material and regenerating said first portion by combustion of contaminants thereon, the products of combustion being excluded from remaining portions, discontinuing the supply of said oxygen-containing gas to said first portion, supplying a stream of oxygen-containing gas to a second portion of said catalytic material while maintaining the passage of said inert gas as aforesaid and regenerating said second portion, passing combustion products derived from the regeneration of said second portion through said first portion, and in like manner regenerating successive portions of said catalytic material by successively diverting said stream of oxygen-containing gas therethrough while passing combustion products serially through all prior regenerated portions.

3. In a method of removing carbonaceous contaminants from a relatively elongated body of solid catalytic material by combustion of said contaminants in an oxygen-containing gas, the improvement which comprises continuously passing an inert gas lengthwise through said body of catalytic material, initially introducing an oxygen-containing gas into said body at a point near the end of said body toward which said inert gas is travelling, passing said oxygen-containing gas through that portion of said body lying between said point and said end to effect combustion of contaminants and regenerate said portion, discontinuing the introduction of said oxygen-containing gas at said first point and recommencing it at a second point more distant from said end than said first point, passing said oxygen-containing gas through that portion of said body lying between said second point and said end to effect combustion of contaminants located between said first and second points and to regenerate catalyst lying between said points, and continuing in like manner to regenerate successive portions of said body of catalyst.

JOHN S. REARICK.